United States Patent
Morell

(10) Patent No.: US 7,100,445 B2
(45) Date of Patent: Sep. 5, 2006

(54) ROTATION RATE SENSOR COMPRISING A VIBRATION GYROSCOPE

(75) Inventor: Heinz-Werner Morell, Kaiserslautern (DE)

(73) Assignee: Siemens Aktiengesellschaft, München (DE)

( * ) Notice: Subject to any disclaimer, the term of this patent is extended or adjusted under 35 U.S.C. 154(b) by 100 days.

(21) Appl. No.: 10/517,757

(22) PCT Filed: Jun. 8, 2004

(86) PCT No.: PCT/EP2004/041055

§ 371 (c)(1),
(2), (4) Date: Dec. 13, 2004

(87) PCT Pub. No.: WO2005/001384

PCT Pub. Date: Jan. 6, 2005

(65) Prior Publication Data

US 2006/0096374 A1    May 11, 2006

(30) Foreign Application Priority Data

Jun. 30, 2003   (DE)   ................................. 103 29 510

(51) Int. Cl.
    *G01C 19/56*   (2006.01)
(52) U.S. Cl. .................................. 73/504.12; 73/504.04
(58) Field of Classification Search ..............................
    73/504.08–504.16, 504.02, 504.04, 1.37,
    73/1.77; 702/145–147, 190–193, 142, 116,
    702/104, 96, 69, 66
    See application file for complete search history.

(56) References Cited

U.S. PATENT DOCUMENTS

| 3,902,374 | A | * | 9/1975 | Hoffman et al. | ........... 74/5.6 D |
| 4,755,057 | A | * | 7/1988 | Curby et al. | ................ 356/473 |
| 4,836,675 | A | * | 6/1989 | Hendow et al. | ............ 356/467 |
| 5,187,664 | A | * | 2/1993 | Yardley et al. | ................ 701/23 |
| 5,359,413 | A | * | 10/1994 | Chang et al. | ................ 356/469 |
| 6,497,146 | B1 | * | 12/2002 | Hobbs et al. | ............. 73/504.12 |

FOREIGN PATENT DOCUMENTS

| EP | 0 307 321 B1 | 8/1991 |
| EP | 0 638 811 B1 | 11/2002 |
| JP | 06-322189 | 12/1994 |

* cited by examiner

*Primary Examiner*—Helen Kwok
(74) *Attorney, Agent, or Firm*—Cohen, Pontani, Lieberman & Pavane

(57) ABSTRACT

In a rotation rate sensor having a vibrational gyroscope which is part of at least one control loop which excites the vibrational gyroscope by supplying an excitation signal at its natural frequency, the vibrational gyroscope provides an output signal from which a noisy rotation rate signal is derived. The noisy rotation rate signal is supplied to inputs on a low pass filter with controllable bandwidth and on a bandpass filter. The output of the bandpass filter is connected to a control input on the low pass filter via a threshold value circuit.

6 Claims, 1 Drawing Sheet

ROTATION RATE SENSOR COMPRISING A VIBRATION GYROSCOPE

PRIORITY CLAIM

This is a U.S. national stage of application No. PCT/EP2004/051055, filed on 8 Jun. 2004 which claims priority on the following application: Country: Germany, Application No.: 103 29 510.0, Filed: 30 Jun. 2003.

BACKGROUND OF THE INVENTION

1. Field of the Invention

The invention relates to a rotation rate sensor having a vibrational gyroscope which is part of at least one control loop which excites the vibrational gyroscope by supplying an excitation signal at its natural frequency, the vibrational gyroscope providing an output signal from which a noisy rotation rate signal is derived.

2. Description of the Prior Art

In rotation rate sensors having a vibrational gyroscope, the output signal which indicates the rotation rate and is caused by the Coriolis force is noisy, which adversely affects subsequent evaluation.

SUMMARY OF THE INVENTION

It is an object of the invention to purge the rotation rate signal of noise as far as possible.

The invention achieves this object by virtue of the noisy rotation rate signal being supplied to inputs on a low pass filter with a controllable bandwidth and on a bandpass filter, and by virtue of the output of the bandpass filter being connected to a control input on the low pass filter via a threshold value circuit. The bandpass filter ensures that the threshold value circuit responds only to changes in the rotation rate signal. In addition, the noise component at the input of the threshold value circuit is reduced by the bandpass filter connected upstream.

In the case of the inventive rotation rate sensor, the noise in the case of a constant or slowly altered rotation rate signal is largely suppressed by the low pass filter. If the rotation rate signal is changing more quickly, however, the band limit of the low pass filter is increased, which means that the fast change is also passed on, with a corresponding noise component being accepted in the short term.

Preferably, the inventive rotation rate sensor has provision for the threshold value circuit and the control input of the low pass filter to have a band selector arranged between them which follows a transition in the output signal from the threshold value circuit by producing a gradual transition in the signal which is supplied to the control input of the low pass filter. The transition time can be adjusted in both directions, i.e. from low band width for the low pass filter to high band width, and vice versa. This avoids interference in the rotation rate signal as a result of the low pass filter suddenly changing over.

In one advantageous requirement of the inventive rotation rate sensor, the bandpass filter lets through changes in the rotation rate signal which are faster than the changes let through by the low pass filter with a minimally set bandwidth and are at most as fast as the fastest changes caused by the rotation of the vibrational gyroscope. This ensures that the bandwidth of the low pass filter is increased when required, but that higher-frequency noise does not influence the control of the low pass filter.

So that the low pass filter is actuated appropriately both for positive and for negative changes in the rotation rate signal, another advantageous refinement provides for an output signal from the threshold value circuit to adopt a first level when the absolute value of the output signal from the bandpass filter is below a prescribed threshold, and also to adopt a second level.

The demands on the rotation rate sensor, for example the rotation rate measurement range or the signal-to-noise ratio, may vary from application to application.

Hence, in line with one development, the band limits of the bandpass filter and the threshold of the threshold value circuit are programmable. In this context, the limits of the adjustment range of the low pass filter and the transition time from the lowest to the highest limit and the transition time from the highest to the lowest bandwidth may also be programmable.

DETAILED DESCRIPTION OF THE PREFERRED EMBODIMENTS

Although the exemplary embodiment and parts thereof are shown as block diagrams, this does not mean that the inventive arrangement is limited to being implemented using individual circuits corresponding to the blocks. Rather, the inventive arrangement can be implemented particularly advantageously using large scale integrated circuits, e.g. digital signal processing. It is also possible to use microprocessors which, with suitable programming, perform the processing steps shown in the block diagrams.

Figure 1:
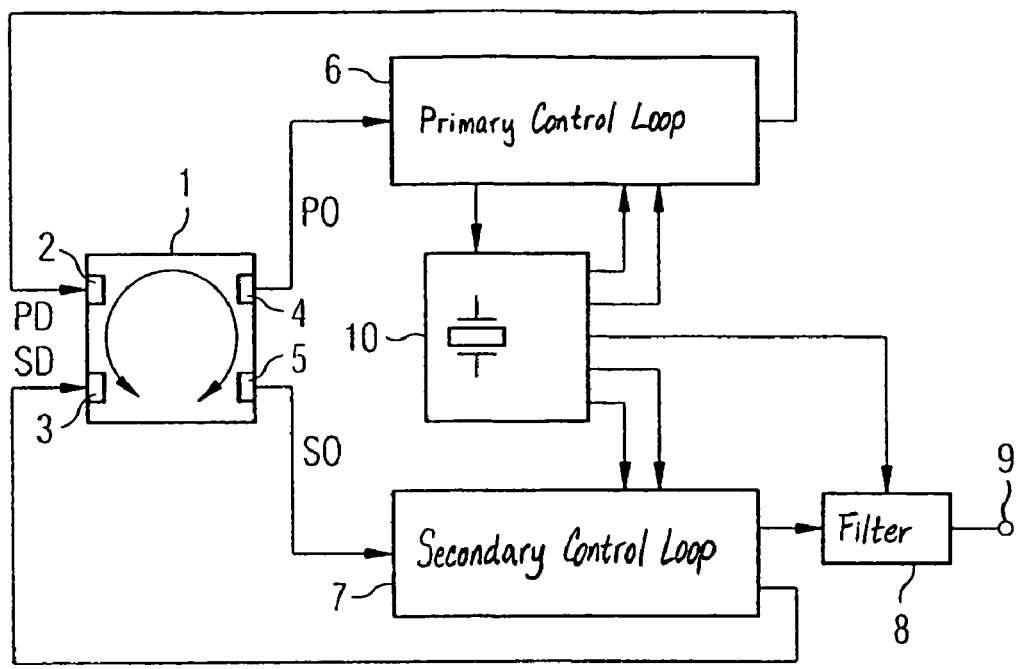
FIG. 1 is a block diagram of a rotation rate sensor with a filter.

FIG. 1 shows a block diagram of an arrangement with a vibrational gyroscope 1 having two inputs 2, 3 for a primary excitation signal PD and a secondary excitation signal SD. The excitation is produced by suitable transducers, for example electromagnetic transducers. The vibrational gyroscope also has two outputs 4, 5 for a primary output signal PO and a secondary output signal SO. These signals forward the respective vibration to physically offset points on the gyroscope. Such gyroscopes are known from EP 0 307 321 A1, for example, and are based on the effect of the Coriolis force.

The vibrational gyroscope 1 represents a high quality filter, with the section between the input 2 and the output 4 being part of a primary control loop 6 and the section between the input 3 and the output 5 being part of a secondary control loop 7. The primary control loop 6 is used to excite oscillations at the resonant frequency of the vibrational gyroscope, for example 14 kHz. In this case, the excitation is produced in an axis of the vibrational gyroscope with respect to which the direction of oscillation used for the secondary control loop is offset through 90°. In the secondary control loop 7, the signal SO is split into an inphase component and a quadrature component, one of which is supplied via a filter 8 to an output 9 from which a signal which is proportional to the rotation rate can be picked off.

In both control loops 6, 7, a fundamental part of the signal processing is performed digitally. The clock signals required for the signal processing are produced in a crystal-controlled digital frequency synthesizer 10 whose clock frequency is 14.5 MHz in the example shown. An explanation of further details is not given, since this is not necessary in order to understand the exemplary embodiment.

Figure 2:
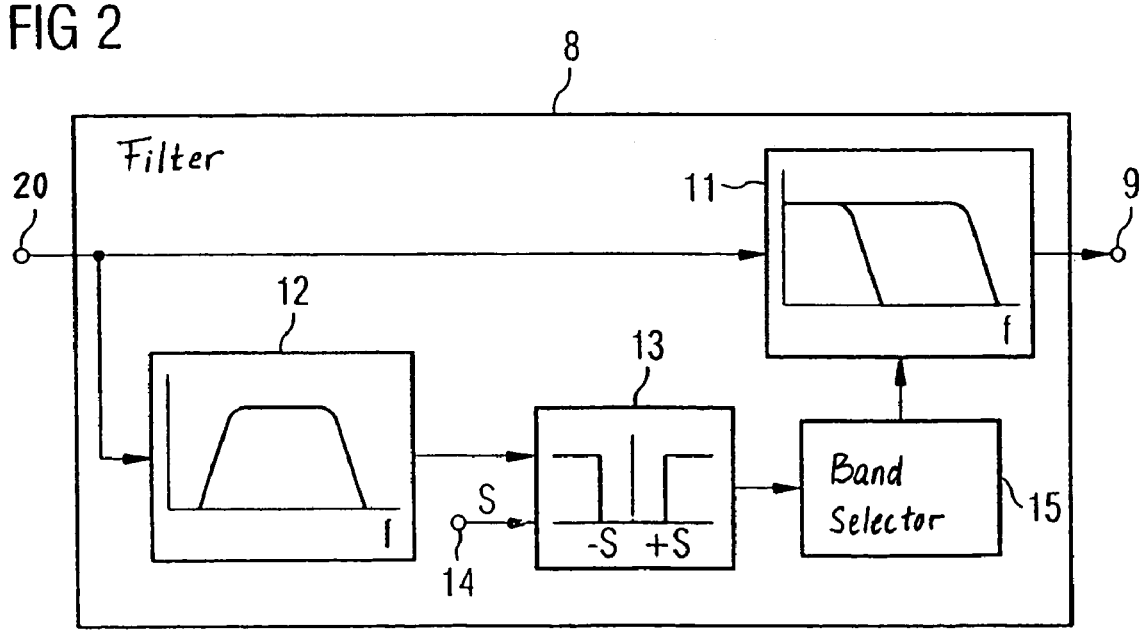
FIG. 2 is a more detailed illustration of the filter.

FIG. 2 shows the filter 8 in a more detailed illustration. The rotation rate signal's path from an input 20 to the output 9 contains a controllable low pass filter 11. In addition, the noisy rotation rate signal is supplied to a bandpass filter 12 whose output is connected to a threshold value circuit 13 which compares the absolute value of the output signal from the bandpass filter 12 with a threshold value S supplied at 14. The output of the threshold value circuit 13 is connected to a band selector 15 which controls the low pass filter 11 such that a transition in the output signal from the threshold value circuit 13 is followed by alteration of the cutoff frequency of the low pass filter 11 in a prescribed time. This time may be prescribed differently for different directions.

To improve understanding of the invention, FIG. 2 schematically shows the amplitude/frequency responses of the low pass filter 11 and of the bandpass filter 12 and also the characteristic of the threshold value circuit 13. As already mentioned, the frequency ranges are dependent on respective applications, in the case of a motor vehicle application essentially on the noise component of rotation rate signal and on the mechanical inertia of the vehicle.

What is claimed is:

1. A rotation rate sensor, comprising:
    a vibrational gyroscope having a natural frequency and connected in at least one control loop, said at least one control loop supplying an excitation signal at the natural frequency of said vibrational gyroscope, said vibrational gyroscope generating an output signal, said at least one control loop deriving a noisy rotation rate signal from said output signal;
    a low pass filter having a control input, a controllable bandwidth being controllable in response to a signal at said control input, and an input connected for receiving the noisy rotation rate signal;
    a bandpass filter having an input connected for receiving the noisy rotation rate signal and an output; and
    a threshold value circuit having an input connected to said bandpass filter output and an output connected to said low pass filter control input such that the bandpass filter output is connected to said low pass filter control input through said threshold value circuit.

2. The rotation rate sensor of claim 1, further comprising a band selector connected between said threshold value circuit and said lowpass filter control input, said band selector responding to a transition in an output signal from the threshold value circuit by generating a gradual transition in the signal fed to said lowpass filter control input.

3. The rotation rate sensor of claim 1, wherein changes in the rotation rate signal allowed to pass through said bandpass filter are faster than changes which are allowed to pass through said lowpass filter, at least when the controllable bandwidth is set to a minimum value, and the changes in the rotation rate signal allowed to pass through said bandpass filter are at most as fast as the fastest changes caused by rotation of the vibrational gyroscope.

4. The rotation rate sensor of claim 1, wherein said threshold value circuit selectively adopts one of at least first and second levels, said first level being adopted when an absolute value of bandpass filter output signal is below a threshold value.

5. The rotation rate sensor of claim 1, wherein said bandpass filter and said threshold value circuit are arranged so that band limits of said bandpass filter and threshold values of said threshold value circuit are programmable.

6. The rotation rate sensor of claim 1, wherein said lowpass filter is arranged so that each of limits of the controllable bandwidth of said lowpass filter, a transition time from the lowest to the highest of the limits, and a transition time from the highest to the lowest of the limits are programmable.

* * * * *

UNITED STATES PATENT AND TRADEMARK OFFICE
CERTIFICATE OF CORRECTION

| | |
|---|---|
| PATENT NO. | : 7,100,445 B2 |
| APPLICATION NO. | : 10/517757 |
| DATED | : September 5, 2006 |
| INVENTOR(S) | : Heinz-Werner Morell |

It is certified that error appears in the above-identified patent and that said Letters Patent is hereby corrected as shown below:

Please replace the PCT No. listed on the Title page with the following:

Item (86) PCT No.      PCT/EP2004/051055
§371(c),(1)
(2), (4) Date:   Dec. 13, 2004

Signed and Sealed this

Ninth Day of January, 2007

JON W. DUDAS
*Director of the United States Patent and Trademark Office*